(12) United States Patent
Gao et al.

(10) Patent No.: US 11,565,294 B2
(45) Date of Patent: Jan. 31, 2023

(54) HEATING SYSTEM FOR DRILL STEEL PIPE BILLET AND HEATING METHOD THEREOF

(71) Applicant: Yanshan University, Qinhuangdao (CN)

(72) Inventors: Xinliang Gao, Qinhuangdao (CN); Shenshen Niu, Qinhuangdao (CN)

(73) Assignee: Yanshan University, Qinhuangdao (CN)

(*) Notice: Subject to any disclaimer, the term of this patent is extended or adjusted under 35 U.S.C. 154(b) by 88 days.

(21) Appl. No.: 17/213,773

(22) Filed: Mar. 26, 2021

(65) Prior Publication Data

US 2021/0299723 A1 Sep. 30, 2021

(30) Foreign Application Priority Data

Mar. 31, 2020 (CN) .......................... 202010247433.2

(51) Int. Cl.
| | |
|---|---|
| *B21B 45/00* | (2006.01) |
| *B21B 37/74* | (2006.01) |
| *B21B 38/00* | (2006.01) |
| *B23K 7/10* | (2006.01) |
| *C21D 1/08* | (2006.01) |
| *C21D 1/52* | (2006.01) |

(52) U.S. Cl.
CPC ............ *B21B 45/004* (2013.01); *B21B 37/74* (2013.01); *B21B 38/006* (2013.01); *B23K 7/10* (2013.01); *C21D 1/08* (2013.01); *C21D 1/52* (2013.01); *B21B 2261/20* (2013.01)

(58) Field of Classification Search
CPC ......... B23K 7/10; B21B 45/004; B21B 37/74; B21B 38/006; C21D 1/08; C21D 1/52
See application file for complete search history.

(56) References Cited

U.S. PATENT DOCUMENTS

| | | | |
|---|---|---|---|
| 2012/0118441 A1* | 5/2012 | Kondo | .................... C22C 38/22 148/570 |
| 2021/0299723 A1* | 9/2021 | Gao | ........................ C21D 1/52 |

* cited by examiner

*Primary Examiner* — Scott R Kastler
(74) *Attorney, Agent, or Firm* — IPro, PLLC

(57) ABSTRACT

A heating system for drill steel pipe billet includes a feedback device configured to control distances $d_1$ and $d_2$ of three flamethrowers, a propulsion device, a positioning device, a heating device, a temperature measuring device and a conveying device. Heating temperature of the flamethrowers is controlled by an oxygen distribution box and a gas distribution box. A heating method for the drill steel pipe billet is also provided, in which a rolling forming method of gradient flame heating is adopted to control density of the rolled pieces and avoid internal defects of the drill steel caused by the same deformation of the traditional uniformly heated pipe billets. A radial temperature of the drill steel pipe billet is accurately controlled through the feedback device. Only one set of flamethrowers corresponding to drill steel pipe billets of different dimensions is required, and other devices are universal components, which will not be replaced.

5 Claims, 5 Drawing Sheets

HEATING SYSTEM FOR DRILL STEEL PIPE BILLET AND HEATING METHOD THEREOF

TECHNICAL FIELD

The present invention relates to the field of heating for drill steel pipe billet, in particular to a heating system for drill steel pipe billet and a heating method thereof.

BACKGROUND TECHNOLOGY

Drill steel, commonly known as rock-drill steel, plays a key role in the process of rock drilling and blasting. Whether it is mining of mineral resources or the construction of infrastructure such as railways and highways, drilling and blasting operations are inseparable from the use of drill steel. Due to the harsh working environment of the drill steel, the drill steel is easily damaged. Therefore, improving the quality of the drill steel and extending its life is the top priority of the is research of the drill steel. The density of the drill steel pipe billet gradually decreases from the outside to the inside, so the internal performance of the drill steel pipe billet is worse than that of the outside.

In the manufacturing process of drill steel, the drill steel pipe billet is heat-treated, and the drill steel is finally formed after more than twenty rolling processes. At present, the heating of the drill steel pipe billet generally adopts a uniform heating method, which will result in the same amount of deformation in different parts of the drill steel during the rolling process. The defect of different radial densities in the drill steel pipe billets themselves will cause the drill steel finally formed by the drill steel pipe billets after multiple rolling to still have radial density differences, although the internal densities will be improved. Therefore, the drill steel is prone to radial fracture during the work, thereby reducing the service life of the drill steel.

SUMMARY OF THE INVENTION

In order to overcome the above-mentioned shortcomings of the prior art, the present invention provides a heating system for drill steel pipe billets, and achieves control of the densities of the rolled drill steel pipe billets by providing a low-temperature flamethrower, a medium-temperature flamethrower and a high-temperature flamethrower, and by using a rolling forming method with gradient flame heating. The present invention can overcome the defect that the drill steel has different radial density after rolling due to the uniform heating method of the drill steel pipe billet, and thus improve the service life of the drill steel.

One aspect of the present invention provides a heating system for drill steel pipe billet, comprising a propulsion device, a positioning device, a heating device and a temperature measuring device, the propulsion device includes an electric motor, a shrink cylinder, a propulsion rod, a propulsion slider, a propulsion bracket, a connecting rod, a propulsion chute, and a propulsion base, the propulsion base is provided with the propulsion chute, and the electric motor is installed on the propulsion base, the shrink cylinder is connected to the electric motor, the first end of the propulsion rod is connected to the shrink cylinder, the second end of the propulsion rod is connected to the propulsion slider, and the propulsion slider is installed on the propulsion chute, the first end of the propulsion bracket is installed on the propulsion slider, the second end of the propulsion bracket is connected with the connecting rod; the connecting rod is connected with the pipe clamp, the pipe clamp is used to fix corresponding gas pipeline, and one set of propulsion devices are installed on left and right respectively; the electric motor controls the propulsion rod to move back and forth in the shrink cylinder, the propulsion rod propels the propulsion slider to move in the propulsion chute, and the propulsion slider finally acts on the corresponding gas pipeline through the motion transfer of the propulsion bracket, the connecting rod and the pipe clamp, and the gas pipeline propels the corresponding flamethrower to move back and forth on the guide rod, which results in a change in a high-medium temperature distance $d_1$ between a high-temperature flamethrower and a medium-temperature flamethrower and a medium-low temperature distance $d_2$ between the medium-temperature flamethrower and a low-temperature flamethrower;

the positioning device includes a main body base, a positioning chute, a wing nut, a positioning shrink cylinder, a positioning frame, a trapezoidal plate, a rotating link, a nut, and a threaded rod, the positioning chute is provided on the main body base, the positioning shrink cylinder is installed on the positioning chute, the wing nut is installed on the side of the positioning shrink cylinder, the positioning frame is installed on the positioning shrink cylinder, and a first end of the rotating link is fixed on the positioning frame, a second end of the rotating link is fixed on the trapezoidal plate, the threaded rod is fixedly connected under the is trapezoidal plate, and the threaded rod passes through the main body base and is provided with the nut below the main body base; one set of positioning devices are installed at the front and rear respectively, and the threaded rod is moveable up and down through the rotation of the nut; the threaded rod drives the trapezoidal plate to move up and down, the up and down movement of the trapezoidal plate drives the rotation of the rotating link, and the rotation of the rotating link drives the clamping and loosening of the positioning frame, thereby realizing the positioning of the guide rod; the positioning frame is moveable up and down in the positioning shrink cylinder, so that the positions of the high-temperature flamethrower, the medium-temperature flamethrower, and the low-temperature flamethrower are all aligned with the center of the inner hole of the drill steel pipe billet; the positioning frame is fixed by tightening the wing nut, and the positioning shrink cylinder is slideable in the positioning chute;

the heating device includes the low-temperature flamethrower, the medium-temperature flamethrower, and the high-temperature flamethrower arranged on the guide rod at intervals in sequence, and the low-temperature flamethrower, the medium-temperature flamethrower, and the high-temperature flamethrower each include a flame nozzle, an outer wall, a cavity, an oxygen hole, an upper pipe perforation, an inner wall, a gas hole, a lower pipe perforation and a combustion-supporting port; a plurality of flame nozzles are provided on the outer wall, and the cavity is provided between the outer wall and the inner wall; the cavity is provided with the oxygen hole, the gas hole and the combustion-supporting port; the inner side of the inner wall is provided with a through hole, and the through hole is divided into the upper pipe perforation and the lower pipe perforation by the guide rod;

the temperature measuring device includes an infrared thermometer for point A, an infrared thermometer for point B, a temperature measuring plate and a temperature measuring bracket, and the infrared thermometer for point A and the infrared thermometer for point B are fixed on the temperature measuring plate to is measure the temperature of point A and point B, respectively; the points A and B respectively represent the outside and inside of the drill steel pipe billet; the temperature measuring plate is fixed on the temperature measuring bracket, and the temperature measuring bracket is installed on the main body base.

Preferably, the heating device further comprises an oxygen cylinder, an oxygen delivery pipe, an oxygen distribution box, a low-temperature oxygen delivery telescopic pipe, a medium-temperature oxygen delivery telescopic pipe, a high-temperature oxygen delivery telescopic pipe, a gas distribution box, a gas cylinder, a gas delivery pipe, a low-temperature gas telescopic pipe, a medium-temperature gas telescopic pipe, a high-temperature gas telescopic pipe, a low-temperature gas pipe, a medium-temperature gas pipe, a high-temperature gas pipe, a low-temperature oxygen delivery pipe, a medium-temperature oxygen delivery pipe and a high-temperature oxygen delivery pipe, the oxygen cylinder is connected to the oxygen distribution box through the oxygen delivery pipe, the low-temperature oxygen delivery telescopic pipe is installed on the oxygen distribution box, and a first end of the low-temperature oxygen delivery pipe is connected to the low-temperature oxygen delivery telescopic pipe, a second end of the low-temperature oxygen delivery pipe is installed on the low-temperature flamethrower; the medium-temperature oxygen delivery telescopic pipe is installed on the oxygen distribution box, and a first end of the medium-temperature oxygen delivery pipe is connected to the medium-temperature oxygen delivery telescopic pipe, a second end of the medium-temperature oxygen delivery pipe is installed on the medium-temperature flamethrower; the high-temperature oxygen delivery telescopic pipe is installed on the oxygen distribution box, and a first end of the high-temperature oxygen delivery pipe is connected to the high-temperature oxygen delivery telescopic pipe, a second end of the high-temperature oxygen delivery pipe is installed on the high-temperature flamethrower; the gas cylinder is connected to the gas distribution box through the gas delivery pipe, and the low-temperature gas telescopic pipe is installed at on the gas distribution box, a is first end of the low-temperature gas pipe is connected to the low-temperature gas telescopic pipe, and a second end of the low-temperature gas pipe is installed on the low-temperature flamethrower; the medium-temperature gas telescopic pipe is installed on the gas distribution box, a first end of the medium-temperature gas pipe is connected to the medium-temperature gas telescopic pipe, and a second end of the medium-temperature gas pipe is installed on the medium-temperature flamethrower; the high-temperature gas a telescopic pipe is installed on the gas distribution box, a first end of the high-temperature gas pipe is connected with the high-temperature gas telescopic pipe, and a second end of the high-temperature gas pipe is installed on the high-temperature flamethrower; the oxygen hole is connected with a corresponding oxygen delivery pipe, the gas hole is connected with a corresponding gas pipe, and the oxygen delivery pipe and the gas pipe pass through the upper pipe perforation and the lower pipe perforation.

Preferably, the heating system further comprises a feedback device, the feedback device includes a control computer, a feedback line and a control line, both ends of the feedback line are respectively connected with the temperature measuring plate and the control computer, and both ends of the control line are respectively connected with the electric motor and the control computer.

Preferably, a high-medium temperature distance $d_1$ between the high-temperature flamethrower and the medium-temperature flamethrower, and a medium-low temperature distance $d_2$ between the medium-temperature flamethrower and the low-temperature flamethrower are adjustable by the propulsion device, and the high-medium temperature distance $d_1$ and the medium-low temperature distance $d_2$ are finely adjustable by the feedback device.

Preferably, the heating system further comprises a conveying device, the conveying device includes a roller, a roller shaft and a roller bracket, and the roller shaft passes through the roller and is fixed on the roller bracket, the roller bracket is installed on the main body base.

Another aspect of the present invention provides a heating method using the is aforementioned heating system for drill steel pipe billet, which includes the following steps:

step 1, determination of the dimensions of the drill steel pipe billet by means of the target drill steel dimensions;

analyzing the dimensions of the roll-formed drill steel according to the principle of constant volume of plastic deformation of the metal, and determining the dimensions of the drill steel pipe billet;

step 2, designing the outer diameters of the low-temperature flamethrower, the medium-temperature flamethrower and the high-temperature flamethrower according to the dimensions of the drill steel pipe billet, and measuring their density distribution;

the outer diameters of the low-temperature flamethrower, the medium-temperature flamethrower, and the high-temperature flamethrower are designed according to the dimensions of the drill steel pipe billet, and the outer diameters of the low-temperature flamethrower, the medium-temperature flamethrower and the high-temperature flamethrower are smaller than the inner diameter of the drill steel pipe billet, while measuring the radial density distribution of the drill steel pipe billet;

step 3, setting the temperatures of the low-temperature flamethrower, the medium-temperature flamethrower, and the high-temperature flamethrower;

setting the temperatures of the low-temperature flamethrower, the medium-temperature flamethrower, and the high-temperature flamethrower, the delivery rate of oxygen of the oxygen distribution box and the delivery rate of fuel gas of the gas distribution box are set by calculation;

step 4, designing the radial temperature according to the dimensions and density of the drill steel pipe billet, and adjusting the high-medium temperature distance $d_1$ and the medium-low temperature distance $d_2$;

establishing a model based on the dimensional parameters of the drill steel is pipe billet, the heating temperatures of the low-temperature flamethrower, the medium-temperature flamethrower, and the high-temperature flamethrower, and the distances between the low-temperature flamethrower, the medium-temperature flamethrower and the high-temperature flamethrower, and the model is thermodynamically simulated, and the rationality of the design parameters is verified by finite element; if $$\frac{\rho_A}{\rho_B} = k\frac{T_B}{T_A}$$

is satisfied, where $\rho_A$ is the density of point A, $\rho_B$ is the density of point B, and $T_A$ is the temperature of the drill steel pipe billet at Point A, $T_B$ is the temperature of the drill steel pipe billet at point B, k is the rolling deformation coefficient, and the value of the coefficient k is related to the selected material and dimensions of the drill steel, the design is reasonable; if not satisfied, return to step 1 to revise the design parameters, and if the condition is satisfied, perform step 5; and step 5, heating and rolling the drill steel pipe billet into shape using the low-temperature flamethrower, the medium-temperature flamethrower and the high-temperature flamethrower.

Compared with the prior art, the present invention can obtain the following beneficial effects:

1. The present invention adopts the rolling forming method of gradient flame heating to realize the control of the density of the drill steel pipe billet after rolling. By controlling the temperature in the radial direction of the pipe billet, the effective control of the radial deformation of the drill steel pipe billet is realized, so that the temperature of the low-density internal is high, the deformation becomes larger, and the temperature of the high-density external is low, and the deformation becomes smaller, and the drill steel with overall high and uniform density can be obtained, avoiding the internal defects of the drill steel caused by the same deformation of the traditional pipe billet after uniform heating, improving the quality of the drill steel, and prolonging the service life of the drill steel.

2. The present invention can accurately control the radial temperature of the is drill steel pipe billet through the feedback device. The high-medium temperature distance $d_1$ and the medium-low temperature distance $d_2$ obtained by calculation and finite element analysis are only theoretical values. In fact, due to the different environment of the heating device, it is impossible to accurately obtain the corresponding temperature gradient of the drill steel pipe billet in reality. Therefore, the feedback device is used to fine-tune $d_1$ and $d_2$ to accurately control the temperature gradient of the drill steel pipe billet.

3. The present invention adopts flame heating with low cost. For drill steel pipe billets of different dimensions, only a set of flamethrowers corresponding to the dimensions needs to be designed, and other devices are universal components, thereby improving the versatility of the equipment and saving cost.

Reference signs: 1—drill steel pipe billet, 2—control computer, 3—feedback line, 4—temperature measuring plate, 5—electric motor, 6—control line, 7—shrink cylinder, is 8—propulsion rod, 9—propulsion slider, 10—propulsion bracket, 11—pipe clamp, 12—connecting rod, 13—propulsion chute, 14—propulsion base, 15—main body base, 16—positioning chute, 17—wing nut, 18—positioning shrink cylinder, 19—positioning frame, 20—trapezoidal plate, 21—rotating link, 22—nut, 23—threaded rod, 24—guide rod, 25—oxygen cylinder, 26—oxygen delivery pipe, 27—oxygen distribution box, 28—low-temperature oxygen delivery telescopic pipe, 29—medium-temperature oxygen delivery telescopic pipe, 30—high-temperature oxygen delivery telescopic pipe, 31—gas distribution box, 32—gas cylinder, 33—gas delivery pipe, 34—low-temperature gas telescopic pipe, 35—medium-temperature gas telescopic pipe, 36—high-temperature gas telescopic pipe, 37—low-temperature gas pipe, 38—medium-temperature gas pipe, 39—high-temperature gas pipe, 40—low-temperature oxygen delivery pipe, 41—medium-temperature oxygen delivery pipe, 42—high-temperature oxygen delivery pipe, 43—low-temperature flamethrower, 44—medium-temperature flamethrower, 45—high-temperature flamethrower, 46—roller, 47—roller shaft, 48—roller bracket, 49—point A infrared thermometer, 50—point B infrared thermometer, 51—temperature measuring bracket, 52—flame nozzle, 53—outer wall, 54—cavity, 55—oxygen hole, 56—upper pipe perforation, 57—inner wall, 58—gas hole, 59—lower pipe perforation, 60—combustion-supporting port.

DETAILED DESCRIPTION OF THE PREFERRED EMBODIMENTS

The present invention will be further described below with reference to the accompanying drawings and embodiments.

Figure 1:
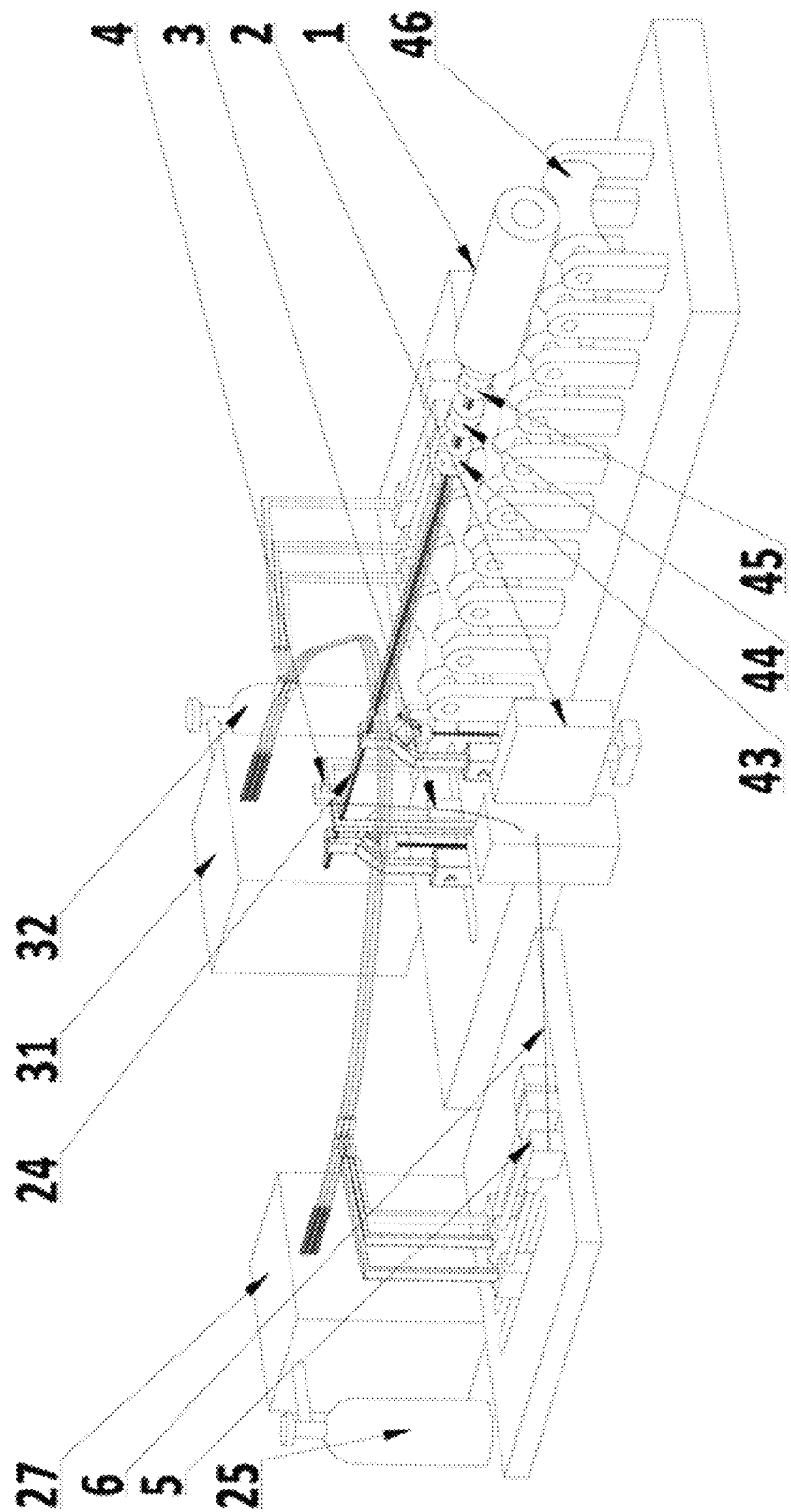
FIG. 1 is a schematic perspective view of the heating system for drill steel pipe billet of the present invention.

FIG. 1 is a schematic perspective view of the heating system for drill steel pipe billet of the present invention, which includes a propulsion device, a positioning device, a heating device, a temperature measuring device, a conveying device and a feedback device. Both ends of the feedback line 3 of the feedback device are respectively connected to the temperature measuring plate 4 and the control computer 2, and both ends of the control line 6 are respectively connected to the is electric motor 5 and the control computer 2.

Figure 2:
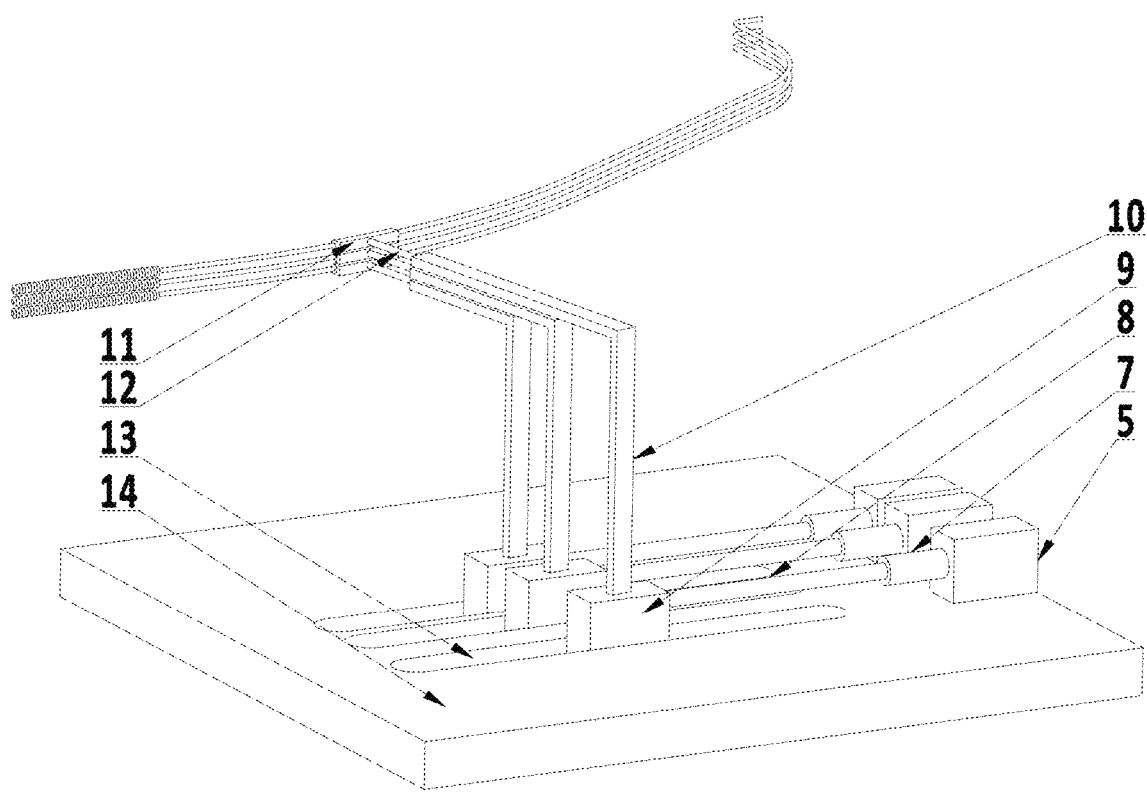
FIG. 2 is a schematic perspective view of the propulsion device of the present invention.

FIG. 2 is a schematic perspective view of the propulsion device of the present invention. The propulsion chute 13 is provided on the propulsion base 14. The electric motor 5 is installed on the propulsion base 14, and the shrink cylinder 7 is connected to the electric motor 5, and the first end of the propulsion rod 8 is connected with the shrink cylinder 7, and the second end of the propulsion rod 8 is connected with the propulsion slider 9. The propulsion slider 9 is installed on the propulsion chute 13, the first end of the propulsion bracket 10 is installed on the propulsion slider 9, and the second end of the propulsion bracket 10 is connected with the connecting rod 12. The connecting rod 12 is connected with the pipe clamp 11, and the pipe clamp 11 is used to fix the corresponding gas pipeline, and one set of propulsion device is installed on the left and right respectively. The electric motor 5 can control the propulsion rod 8 to move back and forth in the shrink cylinder 7, the propulsion rod 8 propels the propulsion slider 9 to move in the propulsion chute 13, and the propulsion slider 9 finally acts on the corresponding gas pipeline through the motion transfer of the propulsion bracket 10, the connecting rod 12 and the pipe clamp 11, and the gas pipeline propels the corresponding flamethrower to move back and forth on the guide rod 24, which results in a change in the high-medium temperature distance $d_1$ between the high-temperature flamethrower 45 and the medium-temperature flamethrower 44 and the medium-low temperature distance $d_2$ between the medium-temperature flamethrower 44 and the low-temperature flamethrower 43.

Figure 3:
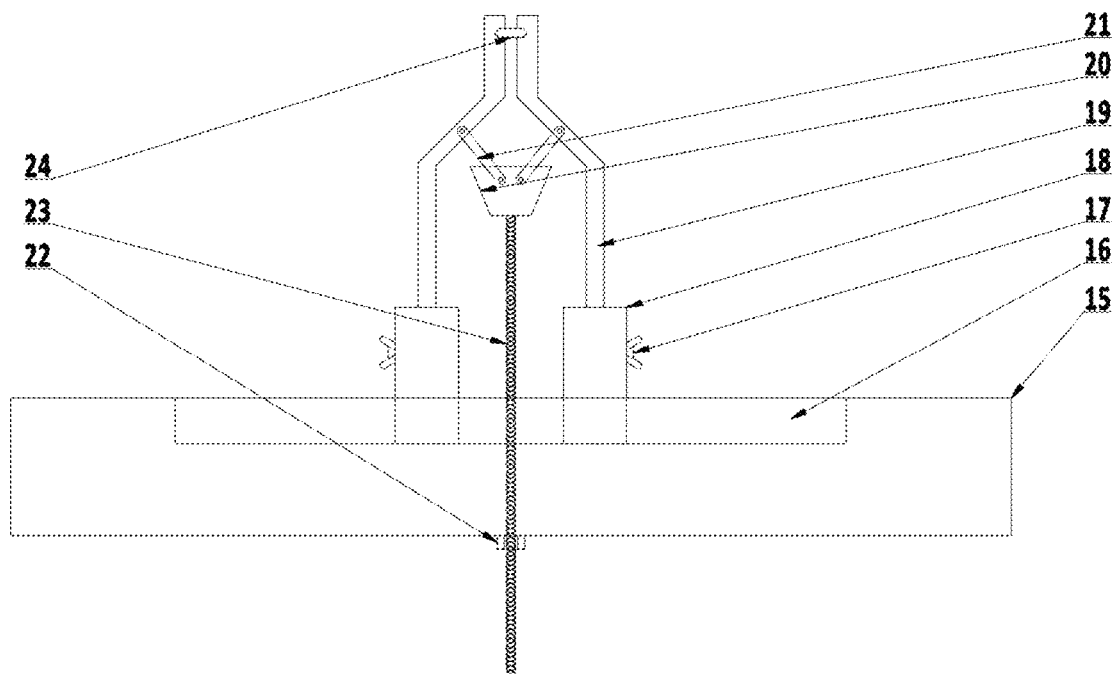
FIG. 3 is a schematic plan view of the positioning device of the present invention.

FIG. 3 is a schematic plan view of the positioning device of the present invention. The main body base 15 is provided with a positioning chute 16, the positioning shrink cylinder 18 is installed on the positioning chute 16, and a wing nut 17 is installed on the side of the positioning shrink cylinder 18. The positioning frame 19 is installed on the positioning shrink cylinder 18. The first end of the is rotating link 21 is fixed on the positioning frame 19, and the second end thereof is fixed on the trapezoidal plate 20. A threaded rod 23 is fixedly connected under the trapezoidal plate 20. The threaded rod 23 passes through the main body base 15 and is provided with a nut 22 below the main body base 15. One set of positioning devices are installed at the front and rear respectively. The threaded rod 23 can be moved up and down through the rotation of the nut 22, and the threaded rod 23 drives the trapezoidal plate 20 to move up and down. The up and down movement of the trapezoidal plate 20 drives the rotation of the rotating link 21, and the rotation of the rotating link 21 drives the clamping and loosening of the positioning frame 19, thereby realizing the positioning of the guide rod 24. The positioning frame 19 can move up and down in the positioning shrink cylinder 18, so that the positions of the high-temperature flamethrower 45, the medium-temperature flamethrower 44, and the low-temperature flamethrower 43 are all aligned with the center of the inner hole of the drill steel pipe billet 1. The positioning frame 19 is fixed by tightening the wing nut 17, and the positioning shrink cylinder 18 can slide in the positioning chute 16.

Figure 4:
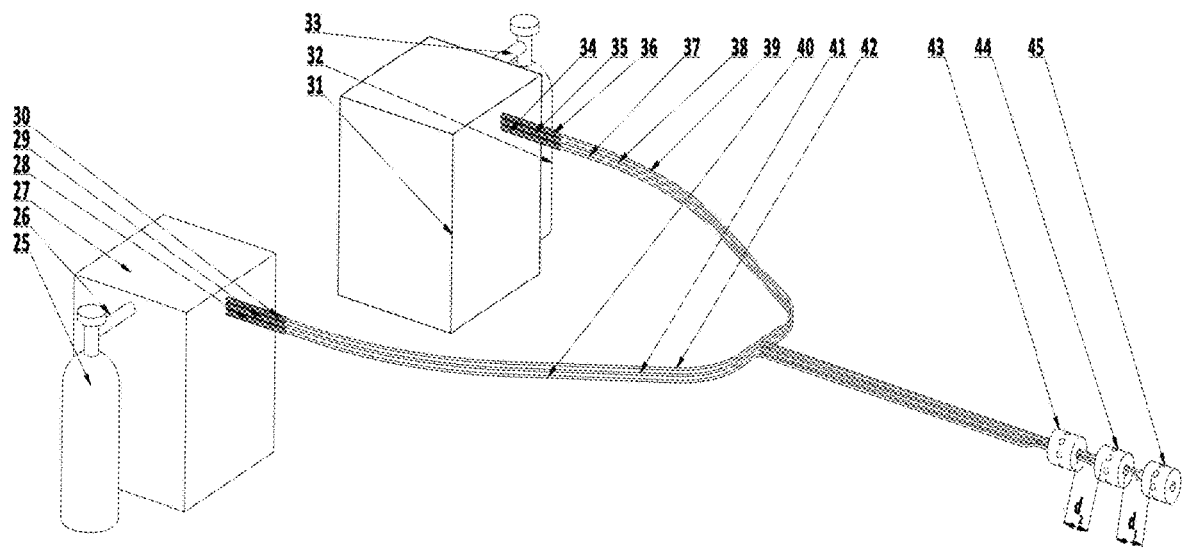
FIG. 4 is a schematic perspective view of the heating device of the present invention.

FIG. 4 is a schematic perspective view of the heating device of the present invention. The oxygen cylinder 25 is connected to the oxygen distribution box 27 through the oxygen delivery pipe 26. The low-temperature oxygen delivery telescopic pipe 28 is installed on the oxygen delivery box 27. The first end of the low-temperature oxygen delivery pipe 40 is connected to the low-temperature oxygen delivery telescopic pipe 28, the second end of the low-temperature oxygen delivery pipe 40 is installed on the low-temperature flamethrower 43; the medium-temperature oxygen delivery telescopic pipe 29 is installed on the oxygen distribution box 27, the first end of the medium-temperature oxygen delivery pipe 41 is connected to the medium-temperature oxygen delivery telescopic pipe 29, the second end of the medium-temperature oxygen delivery pipe 41 is installed on the medium-temperature flamethrower 44; the high-temperature oxygen delivery telescopic pipe 30 is installed on the oxygen distribution box 27, the first end of the is high-temperature oxygen delivery pipe 42 is connected to the high-temperature oxygen delivery telescopic pipe 30, and the second end of the high-temperature oxygen delivery pipe 42 is installed on the high-temperature flamethrower 45; the gas cylinder 32 is connected to the gas distribution box 31 through the gas delivery pipe 33, the low-temperature gas telescopic pipe 34 is installed on the gas distribution box 31, and the first end of the low-temperature gas pipe 37 is connected to the low-temperature gas telescopic pipe 34, the second end of the low-temperature gas pipe 37 is installed on the low-temperature flamethrower 43; the medium-temperature gas telescopic pipe 35 is installed on the gas distribution box 31, and the first end of the medium-temperature gas pipe 38 is connected to the medium-temperature gas telescopic pipe 35. The second end of the medium-temperature gas pipe 38 is installed on the medium-temperature flamethrower 44; the high-temperature gas telescopic pipe 36 is installed on the gas distribution box 31, and the first end of the high-temperature gas pipe 39 is connected to the high-temperature gas telescopic pipe 36, the second end of the high-temperature gas pipe 39 is installed on the high-temperature flamethrower 45; the oxygen hole 55 is connected with the corresponding oxygen delivery pipe, the gas hole 58 is connected with the corresponding gas pipe, the inner side of the inner wall 57 is provided with a through hole, and the through hole is divided into an upper pipe perforation 56 and a lower pipe perforation 59 by the guide rod 24. The oxygen delivery pipe and the gas pipe can pass through the upper pipe perforation 56 and the lower pipe perforation 59; the oxygen delivery telescopic pipe and the gas telescopic pipe can be extended and shortened with the movement of the propulsion device. The oxygen distribution box 27 and the gas distribution box 31 can control the delivery speed of oxygen and gas to control the heating temperature of the flamethrowers; the purpose of the flamethrowers design with three different temperatures is to allow for a controlled gradient in the radial temperature of the drill steel pipe billet 1. If there is only one flamethrower, only a single radial temperature gradient will be obtained. This application has designed three different high-temperature flamethrowers 45, medium-temperature flamethrowers 44 and low-temperature flamethrowers 43. During production, the number of flamethrowers can be increased or decreased according to the actual situation; the adjustment of the high-medium temperature distance $d_1$ between the high-temperature flamethrower 45 and the medium-temperature flamethrower 44 and the medium-low temperature distance $d_2$ between the medium-temperature flamethrower 44 and the low-temperature flamethrower 43 can control the radial temperature gradient of the drill steel pipe billet 1. The radial temperature gradient of the drill steel pipe billet 1 is not the superposition of the temperature gradients under the separate action of the three flamethrowers.

Figure 6:
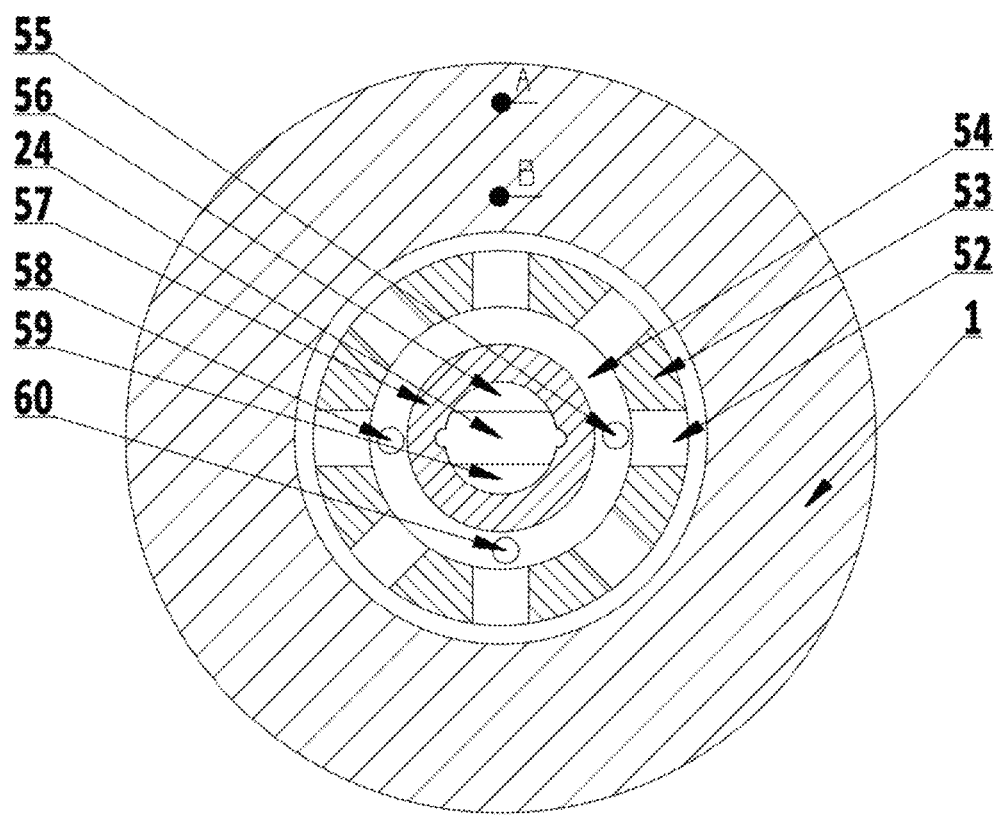
FIG. 6 is a cross-sectional view of a flamethrower of the present invention.

The two points A and B given in FIG. 6 represent the outside and inside of the drill steel pipe billet, respectively. The temperatures of the two points A and B are $T_A$ and $T_B$ respectively. Because the flamethrower heats inside the pipe billet, $T_B > T_A$, and take the high-temperature flamethrower and the medium-temperature flamethrower as an example, because there is a metal heat conduction process between the heating points of the high-temperature flamethrower and the medium-temperature flamethrower, and in this process, there is not only the transverse heat transfer from the high temperature to the medium temperature, but also the longitudinal heat transfer from point B to point A. The longer the high-medium temperature distance $d_1$ of the flamethrower, the more heat is transferred longitudinally, and the smaller the temperature difference between point A and B. Conversely, the shorter the high-medium temperature distance $d_1$, the greater the temperature difference between point A and point B. Therefore, The radial temperature gradient of the drill steel pipe billet 1 can be controlled by the high-medium temperature distance $d_1$ and the medium-low temperature distance $d_2$ between the flamethrowers.

Figure 5:
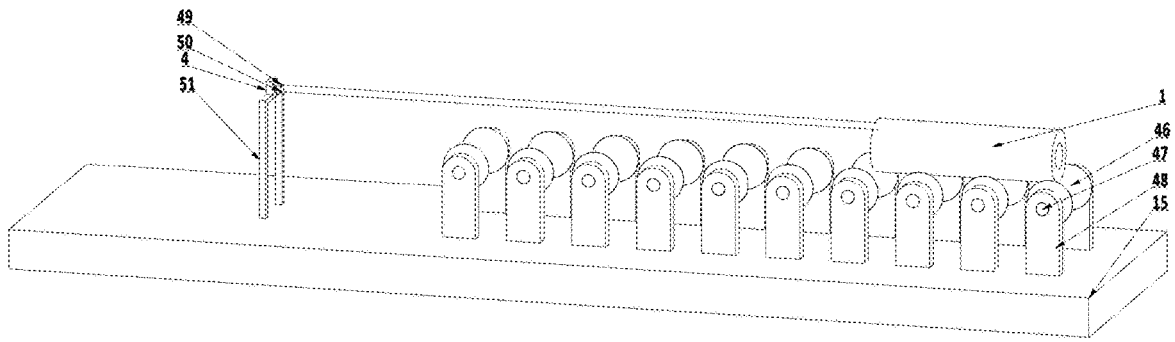
FIG. 5 is a schematic perspective view of the temperature measuring and conveying device of the present invention.

FIG. 5 is a schematic perspective view of the temperature measuring and conveying device of the present invention. In the temperature measuring device, the infrared thermometer 49 for point A and the infrared thermometer 50 for point B is are fixed on the temperature measuring plate 4 to measure the temperature at points A and B respectively. The temperature measuring plate 4 is fixed on the temperature measuring bracket 51, and the temperature measuring bracket 51 is installed on the main body base 15. Two temperature measuring points A and B are given in this patent, which represent the exterior and interior of the drill steel pipe billet 1, and more temperature measuring points can be added in the radial direction of the drill steel pipe billet 1 for precise control of the temperature of the pipe billet in actual situation. In the conveying device, the roller shaft 47 passes through the roller 46 and is fixed on the roller bracket 48. The roller bracket 48 is installed on the main body base 15. The roller 46 rotates counterclockwise to send the drill steel pipe billet 1 into the heating device, and rotates clockwise to send the drill steel pipe billet 1 out of the heating device.

FIG. 6 shows a cross-sectional view of the flamethrower of the present invention. The flamethrower is installed on the guide rod 24 and fixed in the inner hole of the drill steel pipe billet 1. The outer wall 53 is provided with 8 flame nozzles 52, a cavity 54 is provided between the outer wall 53 and the inner wall 57. The cavity 54 is provided with an oxygen hole 55, a gas hole 58 and a combustion-supporting port 60. The oxygen hole 55 is connected to the corresponding oxygen delivery pipe, and the gas hole 58 is connected to the corresponding gas pipe. The inner side of the inner wall 57 is provided with a through hole, and the through hole is divided into the upper pipe perforation 56 and the lower pipe perforation 59 by the guide rod 24. The oxygen delivery pipe and the gas pipe can move back and forth through the upper pipe perforation 56 and the lower pipe perforation 59. The function of the combustion-supporting port 60 is to apply high temperature to the mixed gas in the cavity 54 to make the gas burn rapidly to form a flame.

Figure 7:
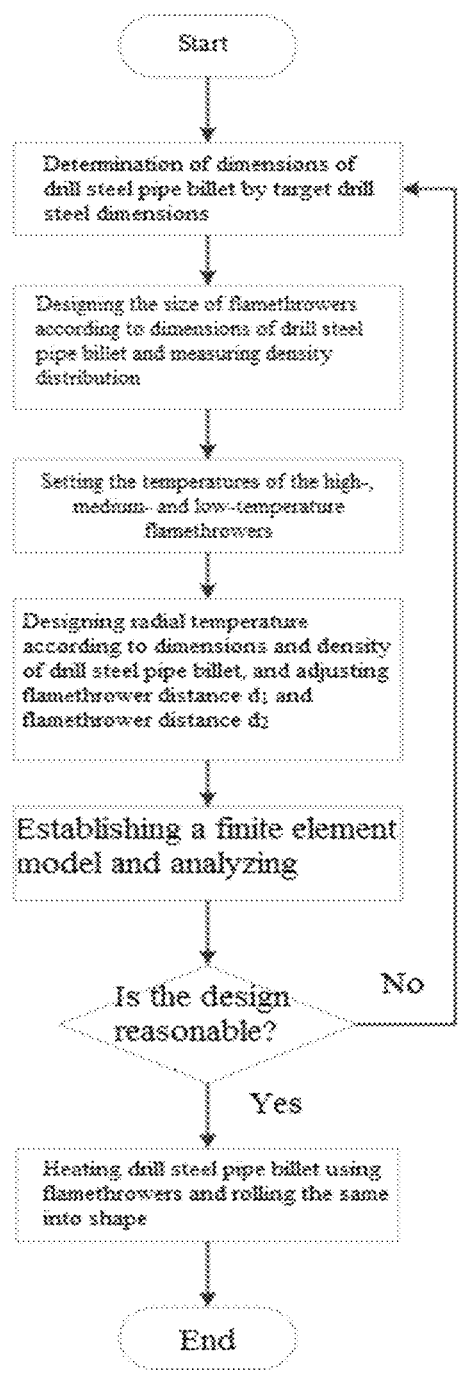
FIG. 7 is a flowchart of a heating method used in the heating system for drill steel pipe billet of the present invention.

FIG. 7 shows a flow chart of the heating method used in the heating system for drill steel pipe billet of the present invention, and the specific steps are as follows:

Step 1, determination of the dimensions of the drill steel pipe billet 1 by means of the target drill steel dimensions;

Analyzing the dimensions of the roll-formed drill steel according to the principle of constant volume of plastic deformation of the metal, and determining the dimensions of the drill steel pipe billet 1;

Step 2, designing the outer diameters of the low-temperature flamethrower 43, the medium-temperature flamethrower 44 and the high-temperature flamethrower 45 according to the dimensions of the drill steel pipe billet 1, and measuring their density distribution;

The outer diameters of the low-temperature flamethrower 43, the medium-temperature flamethrower 44, and the high-temperature flamethrower 45 are designed according to the dimensions of the drill steel pipe billet 1, and the outer diameters of the low-temperature flamethrower 43, the medium-temperature flamethrower 44 and the high-temperature flamethrower 45 are smaller than the inner diameter of the drill steel pipe billet 1, while measuring the radial density distribution of the drill steel pipe billet 1;

Step 3, setting the temperatures of the low-temperature flamethrower 43, the medium-temperature flamethrower 44, and the high-temperature flamethrower 45;

Setting the temperatures of the low-temperature flamethrower 43, the medium-temperature flamethrower 44, and the high-temperature flamethrower 45, the delivery rate of oxygen of the oxygen distribution box 27 and the delivery rate of fuel gas of the gas distribution box 31 are set by calculation;

Step 4, designing the radial temperature according to the dimensions and density of the drill steel pipe billet 1, and adjusting the high-medium temperature distance $d_1$ and the medium-low temperature distance $d_2$;

Establishing a model based on the dimensional parameters of the drill steel pipe billet 1, the heating temperatures of the low-temperature flamethrower 43, the medium-temperature flamethrower 44, and the high-temperature flamethrower 45, and the distances between the low-temperature flamethrower, the medium-temperature flamethrower and the high-temperature flamethrower, and the model is thermodynamically simulated, and the rationality of the design parameters is verified by finite element. If $$\frac{\rho_A}{\rho_B} = k\frac{T_B}{T_A}$$

is satisfied, where $\rho_A$ is the density of point A, $\rho_B$ is the density of point B, and $T_A$ is the temperature of the drill steel pipe billet at Point A, $T_B$ is the temperature of the drill steel pipe billet at point B, k is the rolling deformation coefficient, and the value of the coefficient k is related to the selected material and dimensions of the drill steel, the design is reasonable. If not satisfied, return to step 1 to revise the design parameters, and if the condition is satisfied, perform step 5; and Step 5, heating the drill steel pipe billet using the low-temperature flamethrower 43, the medium-temperature flamethrower 44 and the high-temperature flamethrower 45 and rolling the same into shape.

In the work, the parameters of the heating device are first designed through the flow chart shown in FIG. 7. The material of the drill steel pipe billet is selected as 55SiMnMo, the outer diameter is 61 mm, the inner diameter is 47 mm, the rolling deformation coefficient k is 0.98, and the density $\rho_A$ at point A is determined to be 0.99, the density $\rho_B$ at point B is 0.935, and then the guide rod 24 is fixed to the center of the drill steel pipe billet 1 through the positioning device, and then the drill steel pipe billet 1 is placed on the conveying device, and the flamethrower is propelled through the control of the propulsion device, and the simulated high-medium temperature distance $d_1$ and medium-low temperature distance $d_2$ are controlled to 73 mm and 53 mm. Three flamethrowers are turned on, and the rollers rotate counterclockwise to send the drill steel pipe billet 1 into the heating device. During heating, the feedback device is used to fine-tune $d_1$ and $d_2$ to finally control the $T_A$ temperature of 920° C. and the $T_B$ temperature of 1000° C. After heating, the flamethrower is turned off, and the rollers rotate clockwise to send the pipe billet out of the heating device, and finally the finished drill steel is rolled, the density $\rho_A$ at point A of the finished drill steel is 1, and the density $\rho_B$ at point B is of the finished drill steel is 0.99. The performance of the drill steel has been greatly improved.

The embodiments described above are merely for describing the preferred embodiments of the present invention, and are not intended to limit the scope of the present invention, and various modifications and improvements made by those of ordinary skill in the art on the technical solutions of the present invention should fall in the scope of protection defined by the claims of the present invention without departing from the spirit of the design of the present invention.

What is claimed is:

1. A heating system for drill steel pipe billet, comprising a propulsion devices, positioning devices, a heating device and a temperature measuring device, each of the propulsion devices includes an electric motor, a shrink cylinder, a propulsion rod, a propulsion slider, a propulsion bracket, a connecting rod, a propulsion chute, and a propulsion base, the propulsion chute is disposed on the propulsion base, and the electric motor is installed on the propulsion base, the shrink cylinder is connected to the electric motor, a first end of the propulsion rod is connected to the shrink cylinder, a second end of the propulsion rod is connected to the propulsion slider, and the propulsion slider is installed on the propulsion chute, a first end of the propulsion bracket is installed on the propulsion slider, a second end of the propulsion bracket is connected with the connecting rod; the connecting rod is connected with the pipe clamp, the pipe clamp is configured to fix a gas pipeline, and the propulsion devices are installed on left and right respectively; the electric motor controls the propulsion rod to move back and forth in the shrink cylinder, the propulsion rod propels the propulsion slider to move in the propulsion chute, and the propulsion slider finally acts on the gas pipeline through the motion transfer of the propulsion bracket, the connecting rod and the pipe clamp, and the gas pipeline propels respective flamethrowers to move back and forth on the guide rod, which results in a change in a high-medium temperature distance $d_1$ between a high-temperature flamethrower and a medium-temperature flamethrower and a medium-low temperature distance $d_2$ between the medium-temperature flamethrower and a low-temperature flamethrower;

each of the positioning device includes a main body base, a positioning chute, a wing nut, a positioning shrink cylinder, a positioning frame, a trapezoidal plate, a rotating link, a nut, and a threaded rod, the positioning chute is provided on the main body base, the positioning shrink cylinder is installed on the positioning chute, the wing nut is installed on the side of the positioning shrink cylinder, the positioning frame is installed on the positioning shrink cylinder, and a first end of the rotating link is fixed on the positioning frame, a second end of the rotating link is fixed on the trapezoidal plate, the threaded rod is fixedly connected under the trapezoidal plate, and the threaded rod passes through the main body base and is provided with the nut below the main body base; the positioning devices are installed at the front and rear respectively, and the threaded rod is moveable up and down through the rotation of the nut; the threaded rod drives the trapezoidal plate to move up and down, the up and down movement of the trapezoidal plate drives the rotation of the rotating link, and the rotation of the rotating link drives the clamping and loosening of the positioning frame, thereby realizing the positioning of the guide rod; the positioning frame is moveable up and down in the positioning shrink cylinder, so that the positions of the high-temperature flamethrower, the medium-temperature flamethrower, and the low-temperature flamethrower are all aligned with the center of the inner hole of the drill steel pipe billet; the positioning frame is fixed by tightening the wing nut, and the positioning shrink cylinder is slideable in the positioning chute;

the heating device includes the low-temperature flamethrower, the medium-temperature flamethrower, and the high-temperature flamethrower arranged on the guide rod at intervals in sequence, and the low-temperature flamethrower, the medium-temperature flamethrower, and the high-temperature flamethrower each include a flame nozzle, an outer wall, a cavity, an oxygen hole, an upper pipe perforation, an inner wall, a gas hole, a lower pipe perforation and a combustion-supporting port; a plurality of flame nozzles are provided on the outer wall, and the cavity is provided between the outer wall and the inner wall; the cavity is provided with the oxygen hole, the gas hole and the combustion-supporting port; the inner side of the inner wall is provided with a through hole, and the through hole is divided into the upper pipe perforation and the lower pipe perforation by the guide rod;

the temperature measuring device includes an infrared thermometer for point A, an infrared thermometer for point B, a temperature measuring plate and a temperature measuring bracket, and the infrared thermometer for point A and the infrared thermometer for point B are fixed on the temperature measuring plate to measure the temperature of point A and point B, respectively; the points A and B respectively represent the outside and inside of the drill steel pipe billet; the temperature measuring plate is fixed on the temperature measuring bracket, and the temperature measuring bracket is installed on the main body base.

2. The heating system for drill steel pipe billet according to claim 1, wherein the heating device further comprises an oxygen cylinder, an oxygen delivery pipe, an oxygen distribution box, a low-temperature oxygen delivery telescopic pipe, a medium-temperature oxygen delivery telescopic pipe, a high-temperature oxygen delivery telescopic pipe, a gas distribution box, a gas cylinder, a gas delivery pipe, a low-temperature gas telescopic pipe, a medium-temperature gas telescopic pipe, a high-temperature gas telescopic pipe, a low-temperature gas pipe, a medium-temperature gas pipe, a high-temperature gas pipe, a low-temperature oxygen delivery pipe, a medium-temperature oxygen delivery pipe and a high-temperature oxygen delivery pipe, the oxygen cylinder is connected to the oxygen distribution box through the oxygen delivery pipe, the low-temperature oxygen delivery telescopic pipe is installed on the oxygen distribution box, and a first end of the low-temperature oxygen delivery pipe is connected to the low-temperature oxygen delivery telescopic pipe, a second end of the low-temperature oxygen delivery pipe is installed on the low-temperature flamethrower; the medium-temperature oxygen delivery telescopic pipe is installed on the oxygen distribution box, and a first end of the medium-temperature oxygen delivery pipe is connected to the medium-temperature oxygen delivery telescopic pipe, a second end of the medium-temperature oxygen delivery pipe is installed on the medium-temperature flamethrower; the high-temperature oxygen delivery telescopic pipe is installed on the oxygen distribution box, and a first end of the high-temperature oxygen delivery pipe is connected to the high-temperature oxygen delivery telescopic pipe, a second end of the high-temperature oxygen delivery pipe is installed on the high-temperature flamethrower; the gas cylinder is connected to the gas distribution box through the gas delivery pipe, and the low-temperature gas telescopic pipe is installed at on the gas distribution box, a first end of the low-temperature gas pipe is connected to the low-temperature gas telescopic pipe, and a second end of the low-temperature gas pipe is installed on the low-temperature flamethrower; the medium-temperature gas telescopic pipe is installed on the gas distribution box, a first end of the medium-temperature gas pipe is connected to the medium-temperature gas telescopic pipe, and a second end of the medium-temperature gas pipe is installed on the medium-temperature flamethrower; the high-temperature gas a telescopic pipe is installed on the gas distribution box, a first end of the high-temperature gas pipe is connected with the high-temperature gas telescopic pipe, and a second end of the high-temperature gas pipe is installed on the high-temperature flamethrower; the oxygen hole is connected with a corresponding oxygen delivery pipe, the gas hole is connected with a corresponding gas pipe, and the oxygen delivery pipe and the gas pipe pass through the upper pipe perforation and the lower pipe perforation.

3. The heating system for drill steel pipe billet according to claim 2, further comprising a feedback device, the feedback device includes a control computer, a feedback line and a control line, both ends of the feedback line are respectively connected with the temperature measuring plate and the control computer, and both ends of the control line are respectively connected with the electric motor and the control computer.

4. The heating system for drill steel pipe billet according to claim 3, wherein a high-medium temperature distance $d_1$ between the high-temperature flamethrower and the medium-temperature flamethrower, and a medium-low temperature distance $d_2$ between the medium-temperature flamethrower and the low-temperature flamethrower are adjustable by the propulsion devices, and the high-medium temperature distance $d_1$ and the medium-low temperature distance $d_2$ are finely adjustable by the feedback device.

5. The heating system for drill steel pipe billet according to claim 2, further comprising a conveying device, the conveying device includes a roller, a roller shaft and a roller bracket, and the roller shaft passes through the roller and is fixed on the roller bracket, the roller bracket is installed on the main body base.

\* \* \* \* \*